United States Patent Office 3,555,075
Patented Jan. 12, 1971

3,555,075
NOVEL ANTIFUNGAL AGENTS
William James McGahren, Demarest, N.J., Lester Allen Mitscher, Columbus, Ohio, and John Norman Porter, Ramsey, N.J., assignors to American Cyanamid Company, Stamford, Conn., a corporation of Maine
No Drawing. Filed June 6, 1968, Ser. No. 734,866
Int. Cl. A61k 21/00; C07c 69/74
U.S. Cl. 260—468                                                          4 Claims

ABSTRACT OF THE DISCLOSURE

By cultivation under controlled aerobic conditions of *Sporormia affinis*, there are prepared new compounds of the formula:

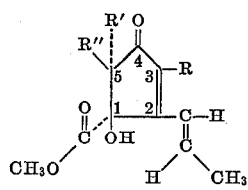

wherein R, R' and R" are individually hydrogen or chloro, but the 5-position has no more than one chloro substituent. All the compounds of this invention have antimicrobial activity.

---

This invention relates to new chemical compounds having antifungal properties and to fermentative methods for preparing these compounds.

The invention is, in one aspect, based upon the discovery that the cultivation under controlled aerobic conditions, of *Sporormia affinis* (Lederle N313) leads to the formation of a new antifungally active culture medium. Another aspect of this invention resides in the finding that the active culture medium can be worked-up to yield a number of new compounds, all of which have useful antifungal activity. Other aspects of this invention will be apparent from the ensuing description thereof.

The novel compounds of the present invention may be represented by the following general Formula I:

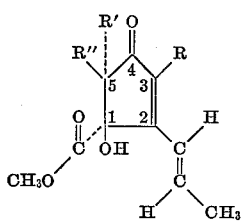

(I)

wherein each of R, R' and R" is hydrogen or chloro, providing that both R' and R" are not simultaneously chloro.

Specific compounds of this invention within Formula I are:

(1) N313β which is chemically 1S,5S-2-transallyl-3,5-dichloro-1-hydroxy - 4 - oxo-2-cyclopentene-1-carboxylic acid, methyl ester.
(2) N313γ which is chemically 1S,5S-2-transallyl-3-chloro-1-hydroxy - 4 - oxo-2-cyclopentene-1-carboxylic acid, methyl ester.
(3) N313δ which is chemically 1S,5R-2-transallyl-3-chloro-1-hydroxy - 4 - oxo-2-cyclopentene-1-carboxylic acid, methyl ester.

In general the compounds of this invention are white crystalline solids which are relatively soluble in common organic solvents, as for example, ether, ethyl acetate, chloroform, benzene, acetone and the lower alcohols. The present invention also includes within its scope the antimicrobial of Formula I in dilute form, e.g., as crude concentrates. The novel products are active against a variety of microorganisms, especially fungi. Accordingly, the novel compounds of this invention are useful in controlling pathogenic organisms responsible for diseases in agricultural crops. For example, spraying fruit orchards with dilute solutions of the novel compounds effectively inhibits the growth of several organisms which have a damaging effect on fruit, e.g., *Venturia inaegualis* and *Monilinia fructigena*.

DESCRIPTION OF THE ORGANISM

The new compounds of Formula I are formed during cultivation under controlled conditions of *S. affinis* (Sacc.) Bomm. and Rouss (hereinafter sometimes called "Lederle N313"). The organism was isolated from a soil sample collected in Mexico. A viable culture of this organism has been deposited with the Culture Collection Laboratory, Northern Utilization Research and Development Division, United States Department of Agriculture, Peoria, Ill., and has been added to its permanent collection. It is freely available in this repository under its accession No. NRRL 3314.

The organism is an Ascomycete belonging to the order Sphaeriales, Taxonomic studies indicated that the culture is a member of genus Sporormia. The organism has black ostiolate ascocarps, 250–400 microns in diameter. Asci are 24–34 microns by 160–220 microns. Ascospores are eight-celled and measure 80–90 microns by 10–14 microns. The sections separate readily. The asci, on the average, are somewhat smaller and the spores a little narrower than those described for *S. affinis*, but the differences appear insignificant. In view of the close correspondence of culture N313 to *S. affinis*, N313 is considered a strain of that species. The species was described by P. A. Saccardo in Sylloge Fungorum 9:819 (1891).

It is to be understood that the production of the novel compounds of the present invention is not limited to the use of the deposited organism or an organism answering fully the above microscopic characteristics, which are given only for illustrative purposes. In fact, it is desired and intended to include the production of these compounds through the use of mutants produced from the described organism by various mutating means such as X-radiation, ultraviolet radiation, nitrogen mustard, and the like.

THE FERMENTATION PROCESS

Cultivation of the organism Lederle N313 may be carried out in a wide variety of liquid culture media. Media which are useful for the production of the novel compounds include an assimilable source of carbon such as starch, sugar, molasses, glycerol, etc.; an assimilable source of nitrogen such as protein, protein hydrolysate, polypeptides, amino acids, corn steep liquor, etc.; and inorganic anions and cations, such as potassium, sodium, calcium, sulfate, phosphate, chloride, etc. Trace elements such as boron, molybdenum, copper, etc., are supplied as impurities of other constituents of the media. Aeration in tanks and bottles is provided by forcing sterile air through or onto the surface of the fermenting medium. Agitation in tanks is provided by a mechanical impeller. An antifoaming agent, such as lard oil may be added as needed.

The following composition is an example of a particularly useful fermentation medium:

| | Grams |
|---|---|
| Corn starch | 15 |
| Cerelose | 10 |
| Beef extract | 5 |
| Bacto-Peptone | 5 |
| Sodium chloride | 5 |
| Dipotassium hydrogen phosphate | 0.5 |
| Soya flour | 10 |

Water to 1,000 milliliters.

Each tank is inoculated with 3 to 10% of inoculum prepared as described below. Aeration at the rate of 0.5 to 1.0 liter of sterile air per liter of broth per minute is continued during fermentation, and the fermenting mixture is agitated by an impeller driven at 200–400 r.p.m. The temperature is maintained betwen about 25 and 29° C., usually at 28° C. The fermentation is ordinarily continued for 100 to 125 hours, after which time, the mash is harvested.

INOCULUM PREPARATION

Shaker flask "seed" inoculum is prepared by inoculating 100-milliliter portions of sterile liquid medium in 500-milliliter flasks with scrapings or washings of spores from an agar slant of the culture. The following medium is ordinarily used.

| | Grams |
|---|---|
| Soybean meal | 10 |
| Glucose | 20 |
| Corn steep liquor | 5 |
| Calcium carbonate | 3 |

Water to 1,000 milliliters.

The flasks are incubated at a temperature from 25–29° C., preferably 28° C., and agitated vigorously on a rotary shaker for 30 to 48 hours. These 100-milliliter portions of seed inoculum are used to inoculate one liter and twelve liter batches of the same medium in 2-liter and 20-liter glass fermentors. The inoculum mash is aerated with sterile air while growth is continued for 30 to 48 hours. These batches of inocula are used in turn to inoculate tank fermentors.

ISOLATION PROCEDURE

After the fermentation is completed, the fermented mash containing the antifungal antibiotics of this invention is filtered to remove the mycelium. Diatomaceous earth or any other conventional inert filtration aid may be used to assist the filtration. Ordinarily the the mycelial cake is washed with water and the wash is pooled with the filtrate. The mycelial cake is discarded. The filtrate is adjusted to about pH 7.0 and the active components are adsorbed onto activated carbon using from 1 to 4% (w./v.) of carbon. The suspension is stirred and then filtered. The carbon pad is eluted batchwise with a mixture of acetone and water (90:10) adjusted to about pH 2 to 3 with hydrochloric acid. The volume of the acetone and water mixture needed is about one-fifth of the original broth volume. The suspension is filtered and the eluted carbon pad is discarded. The eluant is concentrated under reduced pressure to an aqueous phase which is then extracted with chloroform. The chloroform extract is concentrated under reduced pressure to a residual gum. The residual gum containing the antibiotic activity is then subjected to adsorption chromatography over silica gel, or other suitable adsorbant, using a mixture of hexane and chloroform or ethyl acetate and hexane, or the like, as eluting solvent. Appropriate fractions of eluant containing antibiotic activity (determined by bioassay against *Microsporum gypseum*) are combined and concentrated to an oily product.

The oily product is partitioned over acid-washed Celite, using a solvent system comprising 85 parts hexane, 15 parts ethyl acetate, 15 parts methanol, and 6 parts water. The effluent is monitored by optical density measurements at 283 mμ, following suitable dilution. A graphical representation of the measurements shows a small first peak, which is of no interest, followed by two large peaks corresponding to N313β and N313γ, respectively, and one intermediate size final peak corresponding to N313δ. Appropriate fractions of effluent corresponding to each of the three components are combined and concentrated to small volumes under reduced pressure. Suitable solvents are added to induce crystallization of the novel compounds.

PROPERTIES AND USES

The compounds of Formula I exhibited in vitro antifungal activity as shown in the agar streak method with cultures of *Hormodendrum cladosporioides* Z–516, *Triclophyton mentagrophytes* E–11 and *Microsporum gypseum* E–28. Each compound shows activity at a level signficantly lower than 500 mcg./ml. as evidenced by the data in the following table.

TABLE I.—IN VITRO ANTIFUNGAL ACTIVITY

| Organism | Concentration for complete inhibition (mcg./ml.) | | |
|---|---|---|---|
| | N313β | N313γ | N313δ |
| *Hormodendrum cladosporioides* Z–516 | 250 | >250 | >250 |
| *Trichophyton mentagrophytes* E–11 | 31 | 62 | 62 |
| *Microsporum gypseum* E–28 | 62 | 125 | 125 |

The effectiveness of compound N313β against *Venturia inaequalis*, the causative agent of apple scab, is demonstrated by the following test. Host trees are seedling apple trees grown from Red Delicious variety seed. The trees are about twelve inches high and used in groups of three trees for treatment and controls. The test compound is put in solution in an acetone-water (50–50) mixture in concentrations of 1,200, 600 and 300 parts per million (p.p.m.). The test solutions are sprayed onto the foliage until "run-off" begins using an atomizing spray gun. The foliage is allowed to dry and the trees are then inoculated by spraying with a conidial suspension of the scab producing organism *Venturia inequalis* prepared from infected apple leaves. Immediately after inoculation the trees are placed in a constant temperature cabinet at 72° F. having a saturated humidity and are held there for 96 hours. At the end of this incubation period the trees are placed in a green house until disease symptoms develop, about 14 days from the day of inoculation. At this time an assessment is made of disease control in treated trees in relation to untreated diseased controls. Results obtained with N313β are summarized in Table 2.

TABLE 2

Compound N313β against apple scab disease

| Concentration, p.p.m.: | Results |
|---|---|
| 1,200 | No disease, severe injury. |
| 600 | No disease, severe injury. |
| 300 | Like controls, no injury. |

The usefulness of N313β for controlling pathogenic organisms responsible for disease in agricultural crops is demonstrated by the following test procedure. This test uses the organisms *Monilinia fructigena*, the pathogen responsible for American brown rot in stone fruits; *Stemphylium sarcinaeforme*, the pathogen which incites leaf spot in legumes; and *Aspergillus niger*, the saprophyte responsible for degradation of textiles, leather, and vegetables. Aqueous suspensions or solutions of the test compound are prepared containing the compound in concentrations of 100, 10 and 1 parts per million (p.p.m.). The test suspension or solutions are placed in one dram "opti-clear" vials and separately inoculated with one drop of a spore suspension prepared from fourteen-day-old cultures of *Monilinia fructigena* and *Stemphylium sarcinaeforme* and seven-day-old cultures of *Aspergillus niger*, all grown on potato-dextrose agar. The vials containing the inoculated test solutions are then capped and placed on a rotating tumbler for 24 hours to insure contact of the organism with the test compound. At the end of this period the vials are removed and observed for inhibition of growth of mycelium. The observations are noted as percent inhibition and given in Table 3, below.

TABLE 3.—ACTIVITY OF N313β AGAINST PATHOGENS

| Organism | Percent inhibition at various concentrations | | |
|---|---|---|---|
| | 100 p.p.m. | 10 p.p.m. | 1 p.p.m. |
| Monilinia fructigena | 100 | 0 | 0 |
| Stemphylium sarcinaeforme | 100 | 95 | 0 |
| Aspergillus niger | 100 | 95 | 0 |

The in vitro antimicrobial spectra of the novel compounds of this invention, determined by the Agar Well diffusion method, are presented in Table 4. Values are distance in mm. from agar well to edge of inhibition zone.

TABLE 4.—IN VITRO ANTIMICROBIAL SPECTRUM AT 1.0 MG./ML.

| Organism | N313β | N313γ | N313δ |
|---|---|---|---|
| Bacillus cereus | 3.4 | sl. | 0 |
| Klebsiella pneumoniae (Friedlander) | 2.9 | 4.1 | 3.6 |
| Alcaligenes sp. ATCC 10153 | 2.9 | 4.6 | 4.6 |
| Hormodendrum cladosporioides | 3.0 | sl. | sl. |
| Bacillus subtilis | 3.0 | 1.9 | 1.9 |
| Bacillus subtilis pH 6 | 10.6 | 3.5 | 5.1 |
| Bacillus subtilis (resistant to Streptothricin) | 3.8 | 2.5 | 2.9 |
| Mycobacterium smegmatis | 2.2 | 3.2 | 3.7 |
| Staphylococcus aureus (resistant to Tetracycline) | 3.6 | sl. | sl. |
| Klebsiella pneumoniae | 2.2 | 6.4 | 5.8 |
| Escherichia coli | 2.5 | 1.8 | 1.8 |
| Escherichia coli (resistant to Chloramphenicol) | sl. | sl. | sl. |
| Streptococcus pyogenes NY5 | sl. | 2.3 | 2.7 |
| Staphylococcus aureus (resistant to Erythromycin) | 4.0 | 2.9 | 3.7 |
| Corynebacterium xerosis NRRL B-1397 (Lederle No. 19) | 5.9 | 4.5 | 4.9 |
| Salmonella gallinarum No. 605 | 2.4 | 2.7 | 3.1 |
| Salmonella gallinarum No. 605 pH 6 | 6.0 | 5.7 | 5.7 |
| Staphylococcus aureus Smith strain | 3.1 | 0 | 0 |
| Klebsiella pneumoniae "A" Strain AD | 5.8 | 6.6 | 6.6 |
| Candida albicans, Strain CA300 | 2.8 | 0 | 0 |
| Pseudomonas aeruginosa ATCC 10145 | 2.1 | 4.3 | 3.9 |
| Proteus vulgaris ATCC 9484 | 3.5 | 6.5 | 7.8 |
| Proteus mirabilis ATCC 9921 | 1.7 | 2.1 | 2.9 |
| Escherichia coli Upjohn Culture 311 | 1.9 | sl. | sl. |
| Aerobacter aerogenes 75 (Harlem Hosp.) | 2.2 | 1.6 | 1.8 |
| Proteus mirabilis | 3.2 | 3.6 | 3.7 |
| Staphylococcus aureus Strain Rose ATCC 14156 | 2.6 | 0 | |

The invention will be described in greater detail in conjunction wth the following specific examples.

EXAMPLE 1

Inoculum preparation

A medium used to grow the primary inoculum is prepared according to the following formula:

| | Grams |
|---|---|
| Soybean meal | 10 |
| Glucose | 20 |
| Corn steep liquor | 5 |
| Calcium carbonate | 3 |

Water to 1,000 milliliters.

The washed or scraped spores from an agar slant were used to inoculate two 500-ml. flasks containing 100 milliliters each of the above medium. The flasks were placed on a rotary shaker and agitated vigorously for 48 hours, at 28° C. The resulting flask inoculum was transferred to a 5-gallon glass fermentor containing 12 liters of sterile medium. The glass fermentor was aerated with sterile air while growth was carried out for about 48 hours, after which the contents were used to seed a 300 l. tnk fermentor.

EXAMPLE 2

Fermentation

A fermentation medium is prepared according to the following formula:

| | Grams |
|---|---|
| Corn starch | 15 |
| Cerelose | 10 |
| Beef extract | 5 |
| Bacto-Peptone | 5 |
| Sodium chloride | 5 |
| Dipotassium hydrogen phosphate | 0.5 |
| Soya flour | 10 |

Water to 1,000 milliliters.

The fermentation medium was sterilized at 120° C. with steam at 20 pounds pressure for 45–60 minutes. The pH of the medium after sterilization was pH 6.0. Three hundred liters of sterile medium in a 400-liter tank fermentor was inoculated with 12 liters of inoculum prepared as described in Example 1, and the fermentation was carried out at 28 C. using Hodag LG-8 oil as a defoaming agent. Aeration was supplied at the rate of 0.5 liter of sterile air per liter of mash per minute. The mash was agitated by an impeller driven at 200 revolutions per minute. At the end of approximately 120 hours of fermentation time, the mash was harvested.

EXAMPLE 3

Isolation

To three hundred liters of fermented mash was added diatomaceous earth in the proportion of 3% weight per volume. The broth was filtered, the filter cake washed with about 30 liters of water, and the filtrate and wash combined. The mycelial cake was discarded. The combined filtrate and washings were adjusted to pH 7.0 and 6.0 kg. of Darco-G60 was added and the mixture was stirred for 30 minutes and then filtered. The carbon pad was washed with water and the filtrate and washings were discarded. The antibiotic-rich carbon pad was slurried and extracted with about 60 liters of a 90:10 mixture of acetone and water adjusted to pH 2.5 with hydrochloric acid, and the extract later concentrated under reduced pressure to remove the acetone. The resultant aqueous phase was extracted with chloroform and the chloroform extract was concentrated to a gum, weight approximately 80 g.

A workable portion of the gum, about 17.5 g., obtained from the chloroform extract was chromatographed over a column of silica gel (600 g.). The column was developed using a solvent mixture of 2 parts of hexane and 1 part of chloroform. One liter fractions were collected and the activity, as determined by bioassay against *Microsporum gypseum* was located in fractions 13 through 21. Concentration of these combined fractions yielded 10.7 g. (61%) of an oily product. The remainder of the charge was eluted using concentrations of 3% or more of methanol in chloroform. The active fraction recovered from the adsorption chromatography column was further purified and resolved into separate fractions by partition chromatography over Celite using a solvent system composed of hexane: ethyl acetate: methanol: water in the following proportions, 85:15:15:6. A 5.0 g. portion of oily product obtained from the silica gel column was partitioned over a column of acid washed Celite (800 g.). Separate 200 ml. fractions were collected and the progress of the elution was followed by measuring the optical density of the effluent at 283 mμ after diluting one to fifty. Fractions 1 through 10 were discarded.

EXAMPLE 4

Preparation of N313β

Combination of fractions 11 through 23 and subsequent concentration yielded an oil from which a solid was obtained on trituration with ether. The solid was separated and recrystallized from ether forming characteristic lumps. About 900 mg. of crude N313β as faintly yellowish crystals was obtained, M.P. 135.5–136.5° C. These crystals were further purified by dissolving in boiling cyclohexane and cooling to give white, needlelike crystals, M.P. 138–139° C. Optical rotation $[\alpha]_D^{25} = +96.5° \pm 2.9$ (C=1.06 in ethyl acetate).

EXAMPLE 5

Preparation of N313γ

Combination of fractions 30 through 51 and subsequent concentration yielded an oil from which 1.0 g. of large sugarlike crystals and an additional 0.5 g. of fine needle-like crystals of N313γ were obtained from ether-hexane solutions. The melting points and infrared spectra of these two crystal lots were identical. Melting point 91.5–92.5° C. Optical rotation $[\alpha]_D^{25} = +105.0° \pm 3.0$ (C=1.00 in ethyl acetate).

EXAMPLE 6

Preparation of N313δ

Combination of fractions 53 through 64 and subsequent concentration yielded an oil from which 600 mg. of crude N313δ was obtained. Several recrystallizations from ether-hexane gave about 400 mg. of purified N313 as faintly off-white crystals, M.P. 83.5–84.5° C. Optical rotation $[\alpha]_D^{25} = +322° \pm 2.9$ (C=1.03 in ethyl acetate).

What is claimed is:
1. A compound of the formula:

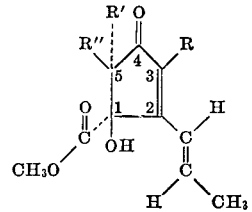

wherein R, R' and R'' are each hydrogen or chloro provided that when one of R' and R'' is chloro, the other is hydrogen.

2. The compound of claim 1 wherein R'' is chloro and R and R' are hydrogen.

3. The compound of claim 1 wherein R' is chloro and R and R'' are hydrogen.

4. The compound of claim 1 wherein R and R'' are chloro and R' is hydrogen.

References Cited

Moye: Tetrahedron Letters, p. 2411 (1964).

LORRAINE A. WEINBERGER, Primary Examiner

R. GERSTL, Assistant Examiner

U.S. Cl. X.R.

195—34; 424—306